United States Patent
Kurihara et al.

[15] 3,635,416
[45] Jan. 18, 1972

[54] FILM-WINDING MECHANISM IN A PHOTOGRAPHIC CAMERA

[72] Inventors: Shigeru Kurihara; Tamotsu Yamazaki; Hideaki Yamamoto; Junichi Yokozato, all of Tokyo, Japan

[73] Assignee: Zenza Bronica Kogyo Kabushiki Kaisha, Tokyo, Japan

[22] Filed: Dec. 23, 1969

[21] Appl. No.: 887,663

[30] Foreign Application Priority Data

Dec. 25, 1968 Japan..............................43/112970

[52] U.S. Cl............................................................242/71.4
[51] Int. Cl........................................G03b 1/10, G03b 1/40
[58] Field of Search..................242/71, 71.3, 71.4, 71.5, 71.6

[56] References Cited

UNITED STATES PATENTS

| | | | |
|---|---|---|---|
| 2,548,172 | 4/1951 | Pollock | 242/71.4 |
| 3,107,065 | 10/1963 | Van Den Broek | 242/71.4 |

Primary Examiner—George F. Mautz
Assistant Examiner—Gregory A. Walters
Attorney—Michael S. Striker

[57] ABSTRACT

Film-transporting mechanism in a photographic camera provided with such constructions that film-transporting operation may be made smooth and positive, while the various complex operations such as multiple exposure or changeover from the longer to the shorter films and vice versa may be carried out in an easy manner.

9 Claims, 13 Drawing Figures

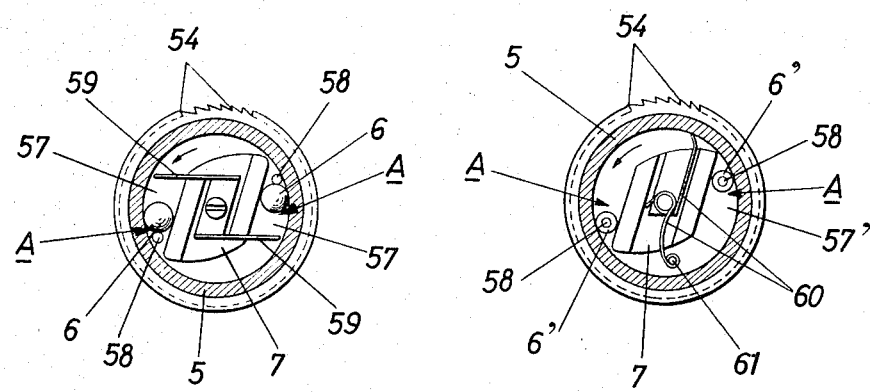
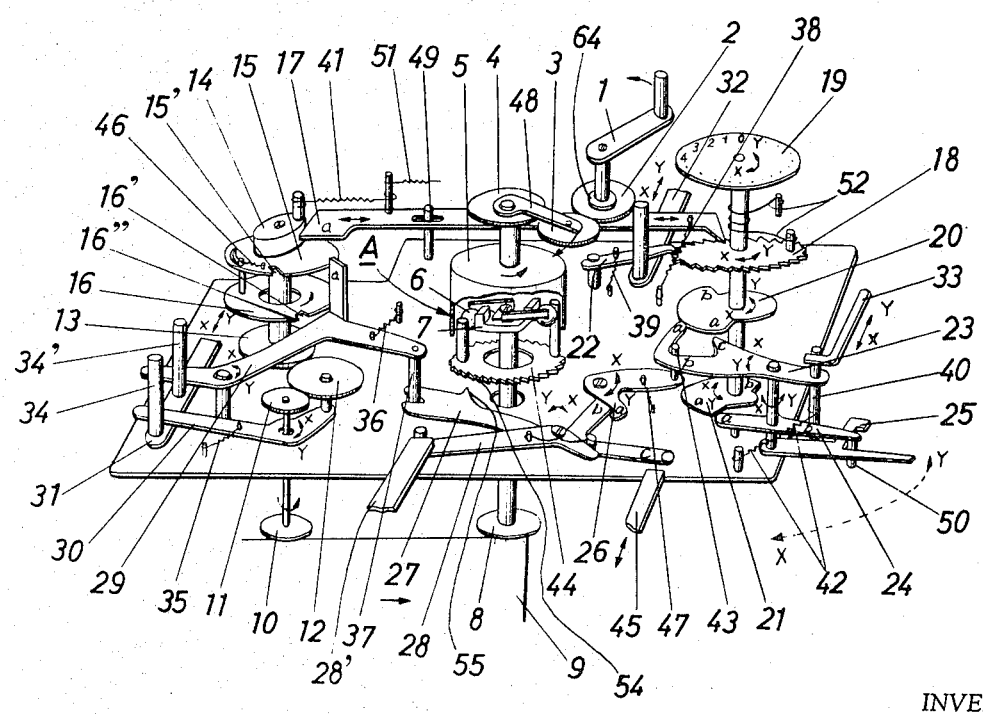

FILM-WINDING MECHANISM IN A PHOTOGRAPHIC CAMERA

This invention relates to a film advancing or transporting mechanism in a photographic camera. More particularly, it relates to a transporting mechanism wherein a film may be fed with foolproof operation in the case of the multiple exposure or the changeover from a longer to a shorter film or vice versa.

In most photographic cameras, when the desired length of a film is wound on a film spool for photographing, coil spring means for actuating shutter curtains and a mirror are stressed in the course of the film winding or advancing operation. When the length of the film wound on the film spool is correlated with the number of rotations of the film spool, the winding of the desired length of the film will become increasingly difficult as the film is wound on the spool. On the other hand, the spring means adapted for actuation of the shutter curtains or the mirror must be stressed up to the certain value by the same operation, or by winding an operating lever or the like by a predetermined number of rotations.

It is an object of the present invention to provide a film-transporting mechanism in a photographic camera which is so arranged and constructed that the film feed may be discontinued upon completed transport of the film through the necessary distance, and spring means associated with the shutter and mirror mechanisms may be stressed as required without regard to the stoppage of the film feed, thanks to the provision of an automatic clutch mechanism.

Secondly, in most photographic cameras, the film-transporting mechanism is operatively associated with the shutter mechanism, and so devised that the film may be fed through a predetermined distance in response to manual rotation of the winding lever or handle. It may thus be feared that when the winding lever or handle is turned forcibly through an excessively large angle, the optimum film feed may not be attained and, moreover, the operation of the shutter mechanism and of other auxiliary mechanisms may be adversely affected.

It is thus another object of the present invention to provide a film-transporting mechanism in a photographic camera wherein a first crank gear adapted for driving the film takeup reel and shutter mechanism is connected operatively with the winding lever or handle through a resilient yieldable friction plate.

The hitherto utilized film-transporting mechanisms are generally quite complex in their construction especially when they are adjustable for successive photographing operations or for use with different film lengths. Such complex construction frequently involves high production cost and occasional malfunctions.

It is thus a further object of the present invention to provide a film-transporting mechanism which is simple in its construction and yet adjustable to the various complex photographing operations.

These and other objects of the present invention will be more fully disclosed in the following detailed description when read in conjunction with the accompanying drawing in which certain preferred embodiments of the invention are illustrated and in which:

FIGS. 3a and 3b are cross-sectional views showing certain parts of the clutches respectively shown in FIGS. 2a and 2b;

FIG. 4 is a perspective view showing an embodiment of the improved film-transporting mechanism;

Figure 5:
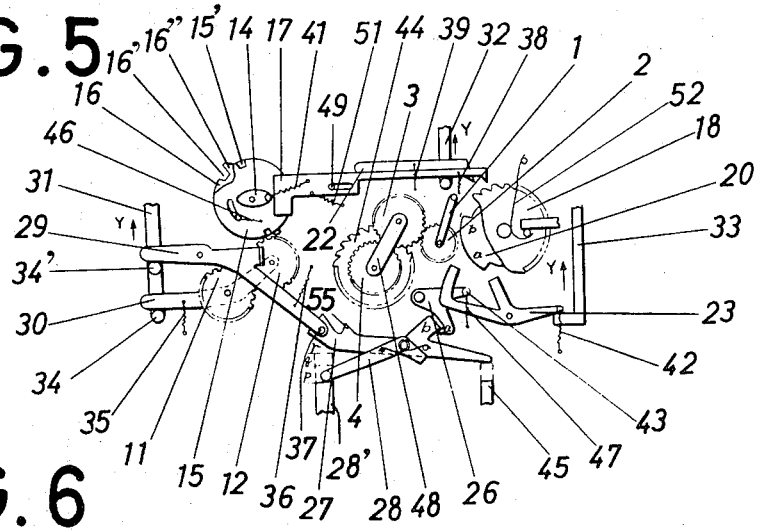
Figure 6:
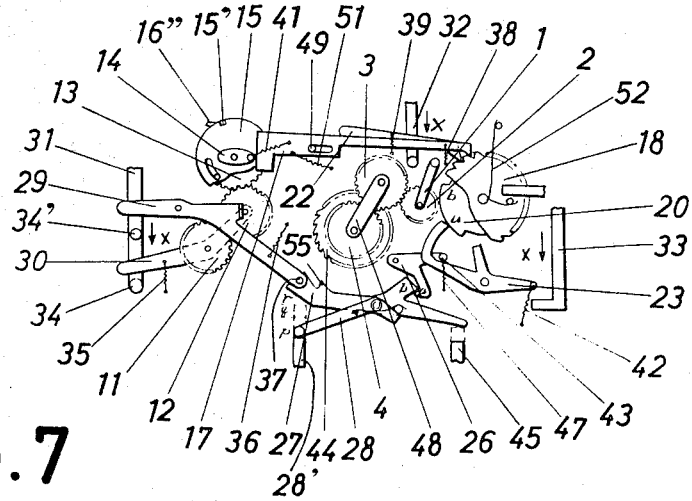
Figure 7:
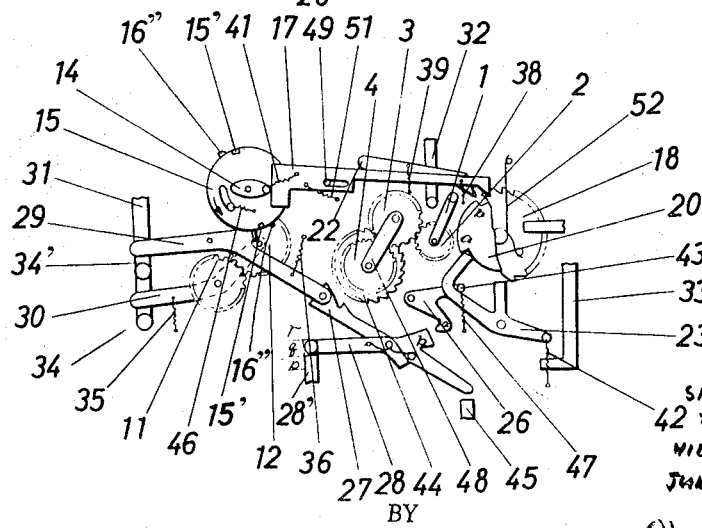
Figure 8:
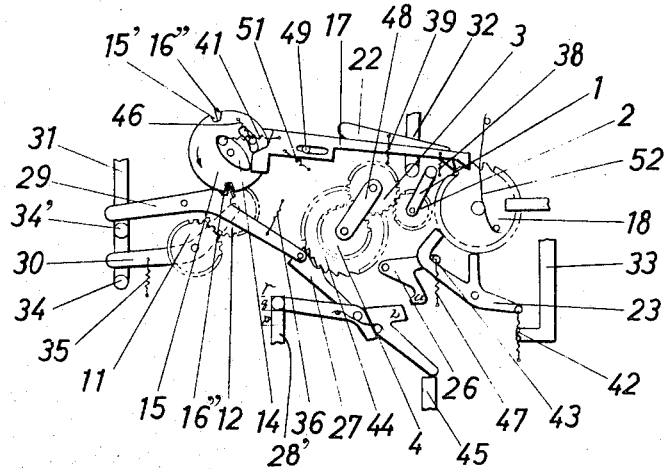
Figure 9:
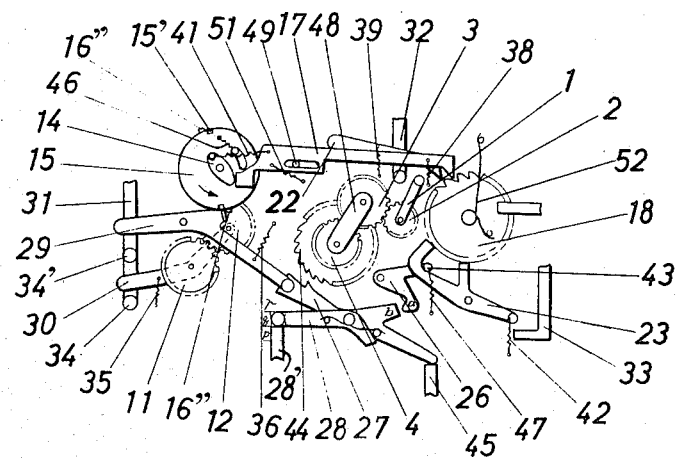
Figure 10:
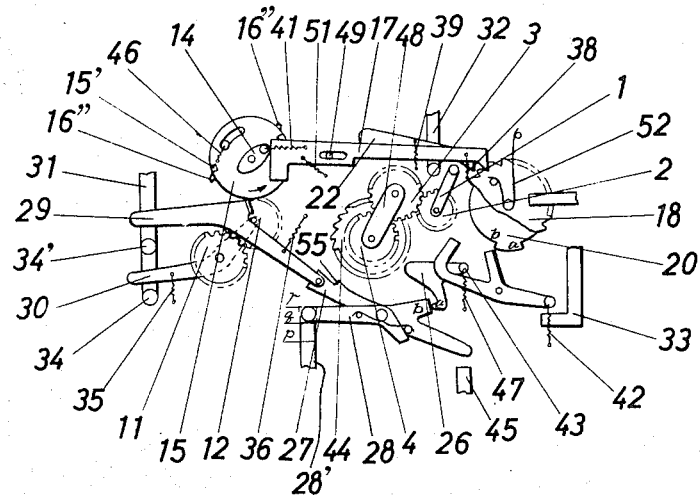
Figure 11:
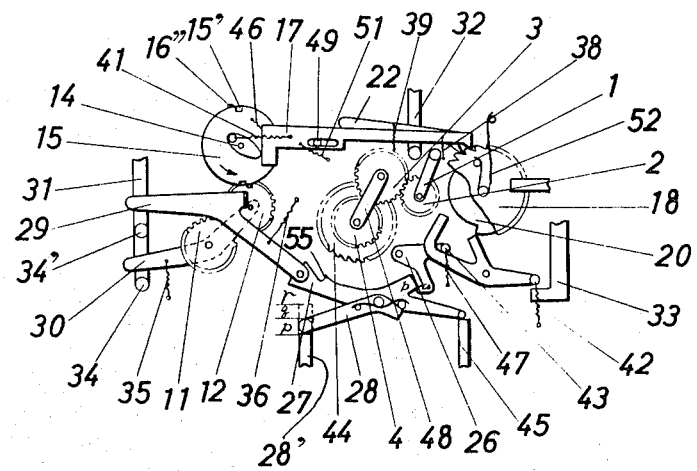

FIGS. 5 to 11 show, in plan views, various operational aspects of the film-transporting mechanism shown in FIG. 4, wherein FIG. 5 shows the mechanism with the cover removed, FIG. 6 shows the mechanism with the film mounted in requisite position and the cover fitted to the casing, FIG. 7 shows the mechanism with the control lever associated with the feed of the longer film is actuated, FIG. 8 shows the mechanism with the film stop signalling lever actuated for disconnecting the film spool from the crank gear, FIG. 9 shows the mechanism immediately following the shutter actuation, FIG. 10 shows the mechanism with the longer film, such as a 12-square film pack, being wound fully on the spool, and FIG. 11 shows the mechanism following the photographing on the last film square of the film pack.

Referring first to FIGS. 4 to 11, a rotary driven member here shown as a gear 2 is secured to the shaft of a rotary film winding or transporting lever 1 and by means of a friction clutch B (FIG. 1) and meshes with a gear 3, which in turn meshes with a gear 4. An automatic clutch mechanism A includes a tubular member 5 which is mounted coaxially with a film takeup reel or spool 8 for feeding a film 9 in the direction of the arrow shown in FIG. 4. The clutch mechanism a further comprises motion transmitting elements in the form of spherical or cylindrical rotors or rollers 6 or 6' and a clutch plate 7 as will be described in detail with reference to FIGS. 2a, 3a and 2b, 3b.

A sensing roller 10 is mounted for rotation in response to transport of the film 9 and positively senses the extent of film transport in the form of an angular distance by which it is rotated. A gear 11 is mounted coaxially with the roller 10 and meshes with a gear 12, which in turn meshes with a gear 13. Numeral 14 denotes a film counter feed cam mounted on a disc 15 which in turn is secured to a shaft mounting said gear 13. A second disc 16 is mounted coaxially with disc 15. Said disc 15 is provided with a recess 15' while disc 16 is provided with a recess 16' and a projection 16''. Prior to insertion of the film 9, said discs 15 and 16 are so positioned that the recess 15', 16' thereof are displaced by 180° with reference to each other. A film counter feed lever 17 is movably mounted in such a way that one end thereof is engaged at all times with said cam 14 by spring action, while the other end thereof meshes with a sprocket wheel 18 in such a way that a film frame counter 19 as well as a longer film feed control cam 20 and a shorter film feed control cam 21 may be actuated simultaneously to rotate intermittently to the extent corresponding to the pitch of the sprocket wheel 18. Numeral 22 denotes a check pawl meshing with the wheel 18, numeral 23 denotes a longer film feed control lever mounted for sliding contact with said cam 20, and numeral 24 denotes a shorter film feed control lever mounted for sliding contact with said cam 21 and associated with a film changeover lever 25. Numeral 26 denotes a rotatable latch member engageable with the end b of a film check or blocking lever 27 and numeral 28 denotes a control lever associated operatively with the shutter mechanism and mounted coaxially with said check pawl 27. A shutter cocking control or check lever 28' is held in contact at all times with said lever 28 by spring action.

Numeral 29 denotes a film stop signalling lever, numeral 30 denotes a control lever for controlling the actuation of the film counter, numerals 31, 32 and 33 denote lever means which may be mechanically coupled with the rear cover of the film casing when the film 9 is inserted in proper position and the said cover is closed. Numerals 34 and 34' denote projections on the lever 31, numeral 35, 36 denote spring means for levers 30, 29, and numeral 37 denotes a projection mounted on control lever 29 and engageable by a forked end of check pawl 27. Numerals 38 and 39 denote spring means for the lever 17, and pawl 22, numeral 40 denotes a projection mounted on lever 23 and engageable with the lever 33 for controlling the actuation of the control levers 23, 24. Numeral 41 denotes a tension spring placed between the cam 14 and film counter feed lever 17, numeral 42 denotes a further tension spring, and numeral 43 denotes an upright projection mounted on the latch 26 and engaging with a recessed part on one end of the control lever 23. Numeral 44 denotes an arresting member here shown as a ratchet wheel which forms part of the automatic clutch mechanism A, numeral 45 denotes a reciprocable lever associated with the shutter release operation, numeral 48 denotes a lever mounted on gear 4 for bringing the gear 3 into and out of mesh with the gear 2, numeral 49 denotes a shaft inserted into an elongated opening on the film counter feed lever 17, numeral 50 denotes a projection mounted on the control lever 24, and numerals 51 and 52 denote tension and torsion spring means, respectively.

The operation of the film-transporting mechanism so far shown and described is as follows:

In FIG. 5 showing the mechanism in the operative position, the film 9 is not yet inserted. When the film 9 is inserted, and the cover is fitted on the film casing, the lever means 31, 32, 33 are shifted simultaneously in the direction denoted at X in FIGS. 1 and 6, by a mechanism which is not shown in the drawing for the sake of simplicity.

With the shifting of the lever 31, control lever 30 is urged to rotate in the direction denoted at X in FIG. 4 under the urging force exerted by the spring 35 whereby the gears 12 and 13 are brought into mesh with each other so as to transmit rotary movement of the roller 10 to the film counter 19. The operative position of the mechanism is shown in FIG. 6. On the other hand, the film stop signalling lever 29 is also turned in the direction denoted at X in FIG. 4, under the force of spring 36, but the rotary motion of the lever 29 is limited by the mechanical connection between projection 37 on the lever 29 and the check pawl 27, which is engaged by the latch member 26 as shown in FIG. 4. In this way, the upright part $a$ mounted on the lever 29 is kept from coming into physical contact with disc 15. With the operative position assumed by each component part of the film-transporting mechanism, control lever 28 is at the position P as shown as FIG. 6, wherein the shutter may not be cocked despite the rotation of the winding lever 1.

On the other hand, with shifting of the lever 33 in the direction X in FIG. 4, control lever 23 is turned clockwise by spring 42 and is brought into physical contact with the periphery of cam 20, as shown in FIG. 6.

When the winding lever 1 is now turned manually in the direction of the arrow in FIG. 4, torque is transmitted to the above-mentioned automatic clutch mechanism A through gears 2, 3 and 4 for turning the takeup spool 8 and transporting the film 9 in the direction of the arrow in FIG. 4. With the transport of the film 9, the sensing roller 10 is rotated in the direction of the arrow, and the rotary movement of the roller 10 is transmitted to the cam 14 fixed on the disc 15 through the gears 11, 12 and 13.

The film counter feed lever 17 engages at $a$ with the cam 14 under the force of spring 41 and is now reciprocated twice per each revolution of the cam 14, as denoted by the arrow in FIG. 4, so that the sprocket wheel 18 associated with the feed lever 17 is turned intermittently in the direction denoted at X in FIG. 4. In this way, the film frame counter 19 and the control cam means 20 and 21 are rotated in unison therewith and in the direction shown at X in FIG. 4.

When the film 9 is advanced through a predetermined distance, control cam 20 is turned through a corresponding angle so that the end part $a$ of the control lever 23 so far engaged with the part $b$ slides against the peripheral part of the control cam 20 and is caused to enter into a recess defined by the part $a$ of the control cam 20. Thus, the control lever 23 is urged to rotate in the direction X under the force of the spring 42, as illustrated in FIG. 7. The latch member 26 which is coupled with the lever 23 by means of the projection 43 is turned in the direction X against the force of a spring 47 consequently, the end part $b$ of the check pawl 27 so far engaged with the part $a$ of the latch member 26, is now disengaged therefrom and is free to rotate, as also shown in FIG. 7. With the check pawl 27 thus released, the lever 29 is turned further in the direction denoted at X in FIG. 4, under the force of the spring 36, until the upright projection $a$ mounted thereon abuts against the peripheral part of the disc 15.

The check pawl 27 is also turned in unison in the direction X in FIG. 4, so that the control lever 28 is also turned together with shutter cocking control lever 28' to the operative position $q$ enabling the lever 28' to carry out the shutter cocking operation. When the winding lever 1 is turned further to advance the film 9, and the discs 15 and 16 are further rotated by one-half of a full revolution, the projection 16" abuts against the upright part $a$ of the lever 29 and the rotary movement of the disc 16 is brought to a halt. In response to continuation of the film advancing operation, the disc 15 is brought to an operative position wherein the recess 15' is aligned with the recess 16' on the disc 16. Thus the upright projection $a$ on the lever 29 is now engaged with the recesses 15' and 16' and the lever 29 is further rotated in the direction X in FIG. 4. With the rotation of the lever 29, the check lever 28 is turned further clockwise, until a pallet 55 on the lever 27 is brought into mesh with the toothed periphery of the ratchet wheel 44 so as to interrupt the mechanical connection between the lever 1 and the film 9 in a manner to be more fully described with reference to FIGS. 2 and 3.

With rotation of check lever 27, the lever 28 is rotated therewith and the check lever 28' is shifted to the operative position $r$. In this way, the shutter cocking operation is continued through manual actuation of the lever, while the film advancing operation is discontinued. The operative positions assumed by the relevant component parts are illustrated in FIG. 8.

When making an exposure on a first film frame, with the film advanced and the shutter cocked in the above-mentioned manner, the shutter mechanism, not shown, is set into actuation. The lever 45 which is operatively connected with the shutter mechanism is reciprocated in the direction of the arrow in FIG. 4. In this way, the part C of the check lever 27 is pushed by the lever 45 and the lever 27 is turned in the direction Y indicated in FIG. 4. With the pivoting of the check lever 27, lever 29 is turned in the direction Y shown in FIG. 4, so that the upright part $a$ on the lever 29 is moved away from engagement with the recesses 15', 16' on the discs 15, 16.

As the upright part $a$ on the lever 29 is retracted at this time from engagement with the projection 16" on the disc 16, the other disc 15 is urged to rotate in the direction of the arrow, under the action of a spring 46, and is returned to its starting position, so that the part $a$ on the lever 29 is brought into contact with the peripheral part of the disc 16. In this way, the check lever 27 is moved away from engagement with the ratchet wheel 44 and the winding lever 1 is ready to advance the film 9. With pivoting of the check lever 27, the lever 28 is also rotated together with the shutter charging control lever 28' to its operative position $q$ in which it prevents actuation of the shutter.

When making a second exposure, the winding lever 1 is turned manually and the film 9 is advanced. With the travel of the film in the direction shown by the arrow in FIG. 4, the discs 14, 15; sprocket gear 18; film counter 19; and control cams 20, 21 are rotated in the way as described in the foregoing. When the film 9 is advanced by the length of a frame, the upright part $a$ on the lever 29 enters into the recesses 15', 16' on the discs 15, 16 in the manner as described in the foregoing. In this way, the transmission of motion from the winding lever 1 to the film 9 is terminated, and the shutter mechanism is ready for operation.

When making successive exposures, lever 48 is turned in a direction shown by the arrow, for bringing the gear 3 out of mesh with the gear 2. Then, the control lever 28 is turned by the check lever 28' in the direction denoted at X, against the force of the spring 49, to the operative position $r$ enabling the shutter release operation. Then, the shutter mechanism may be cocked by the turning of the winding lever 1 without regard to the film advancing mechanism.

When the film changeover lever 25 is turned manually in the direction denoted at X in FIG. 4 to a position wherein the part $a$ on the control cam 21 is kept out of contact with the part $a$ on the control lever 24, then the part $b$ on the control cam 20 abuts against the part $c$ on the control lever 23, in the course of transport of the last film frame, so as to turn the lever 23 in the direction Y shown in FIG. 4. The operative position of the relevant component parts is illustrated in FIG. 10.

In this way, the part b on the lever 23 is moved away from engagement with the projection 43, so that the latch member 26 is turned in the direction of the arrow Y, under the force of the spring 47, until the part a of the latch 26 abuts on the part b of the check lever 27 and the latch member 26 is thus brought to a halt.

When the winding lever 1 is rotated further, the lever 29 comes into operation, so that the film 9 is no longer advanced but the shutter mechanism is ready for shutter release operation.

When the shutter mechanism is now actuated, there is caused a reciprocating movement of the lever 45 in the above-mentioned manner, and the check lever 27 is pivoted in the direction shown at Y in FIG. 4. The end part a of the latch member 26 is now engaged with the part b of the check lever 27 and the latter is retarded from its pivoting movement in the direction denoted at X in FIG. 4, so that the lever 29 is also rendered inoperative. On the other hand, the lever 28 is moved to a position p wherein it prevents actuation of the shutter. The operative positions of the various component parts are shown in FIG. 11.

When the winding lever 1 is turned manually, the shutter cocking operation does not take place and the entire length of the longer film may be wound up on the reel. When the film changeover lever 25 is turned in the direction Y in FIG. 4, at the time of insertion of the film, and set to a position wherein the part a of the control cam 21 is contactable by the part a of the control lever 24 when the cam 21 is turned in the course of transport of the last film frame, the part a of the control cam 21 abuts on the part a of the control lever 24 when the transport of the last film frame is completed and the lever 24 is turned in the direction Y shown in FIG. 4. At this time, the part b of the control lever 24 abuts against projection 40 mounted on the control cam 23 and the lever 24 is turned in the direction at Y in FIG. 4. The subsequent operation is same as described in the case of the longer film.

When the whole length of the film is wound up on the reel, and the cover removed, the lever means 31, 32, 33 operatively associated with the cover may now be shifted in their position in the directions shown at Y in FIG. 4.

In this way, the gears 12 and 13 are moved away from each other and the film counter feed lever 17 as well as the check pawl 22 are disengaged from the ratchet wheel 18. On the other hand, the lever 23 is pivoted in the direction shown at Y in FIG. 4 and is disengaged from the control cam 20, so that the film counter 19 as well as the check pawl 18 and cams 20, 21 are pivoted in the direction shown at Y in FIG. 4 and returned to their starting operative positions.

As will become apparent from the foregoing description, the film transporting or advancing operation may be carried out in an easy and positive way in the case of the multiple exposure or in case that the films having different lengths are used.

Figure 2A:
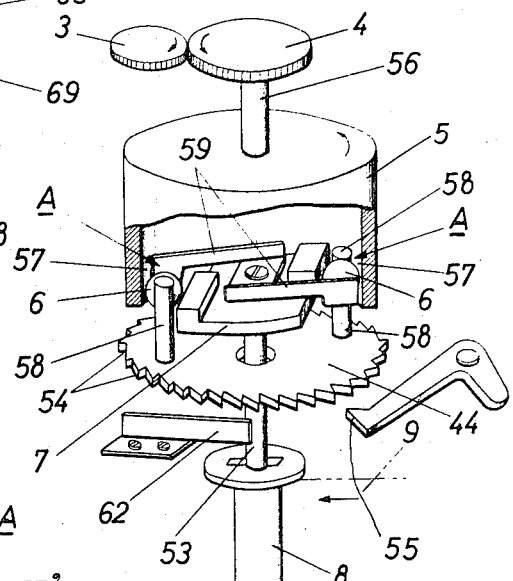
FIGS. 2a and 2b are partly sectional perspective views showing two embodiments of the improved film-transporting mechanism each comprising an automatic clutch constructed in accordance with the present invention.
Figure 2B:
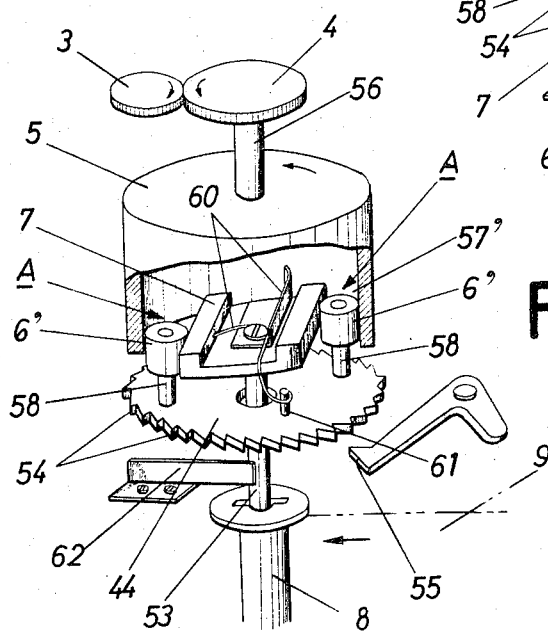

In FIGS. 2 and 3, there are shown two embodiments of the automatic clutch mechanism according to the present invention. In FIGS. 2a, 2b, 3a and 3b, numeral 53 denotes a rotary shaft on which the film takeup spool 8 may be mounted. The clutch plate 7 is secured to the shaft 53. The ratchet wheel 44 described by reference to FIGS. 4 to 11 has a number of ratchet teeth 54 and is mounted for free rotation on the rotary shaft 53. The arrangement is such that the pallet 55 on the check lever 27 as shown in FIG. 4 is brought into engagement with the ratchet teeth 54 on the wheel 44 and prevents the rotation of the latter when the desired length of the film 9 is wound on the spool 8. In the embodiment shown in FIGS. 2a and 3a, the clutch plate 7 is mounted in the tubular member 5 with the spaces 57, 57 therebetween which are increasingly reduced in their width in the direction of rotation of the member 5, as best shown in FIG. 3a. The spherical rotors 6, 6 are rollably inserted in the spaces 57, 57, while the projections 58, 58 mounted on the upper surface of the wheel 44 abut against the rotors 6, 6 on the sides opposite to the projections 59, 59 provided on the plate 7 for preventing the rotors 6, 6 from moving out of the spaces 57, 57.

In the embodiment shown in FIGS. 2b, 3b, the clutch plate 7 is mounted in the tubular member 5 so that the spaces 57', 57' formed therebetween will be increasingly reduced in the direction of rotation of the member 5. A pair of rollers 6', 6' are mounted for sliding contact with the internal surface of the tubular member 5 and free rotation on shafts 58, 58 secured to the upper face of the ratchet wheel 44. The arrangement is such that the rollers 6', 6' will be brought into frictional engagement with the internal surface of the tubular member 5 and the adjacent side faces of the clutch plate 7, thereby transmitting rotation from the tubular member 5 to the clutch plate 7 for driving the film spool 8. In FIGS. 2b and 3b, there is provided a link means for the ratchet wheel 44 and the clutch plate 7 comprising a spring 60 and a stop 61 mounted on the ratchet wheel 44. Numeral 62 in FIGS. 2b denotes a resilient brake shoe bearing against the rotary shaft 53.

In the above-mentioned construction, when the gears 3 and 4 are driven in the directions shown in FIGS. 2a and 2b, the tubular member 5 is rotated. Then, the rotors 6, 6 or the rollers 6', 6' are brought into frictional engagement with the internal surface of the tubular member 5 and the clutch plate 7, so that the latter may be rotated in unison with the tubular member 5. Rotation of the clutch plate 7 may be transmitted to the rotary shaft 53 of the film spool 8 for film-transporting operation.

When the predetermined length of the film 9 is wound on the film spool 8, the pawl 55 is brought into engagement with the ratchet wheel 44, and the latter is prevented from rotation. In FIGS. 2a and 3a, the projections 58 kept in rotation with the members 6, 6 are brought to a halt. Thus, the members 6, 6 are moved out of frictional engagement with the tubular member 5 and the clutch plate 7. In the embodiment shown in FIGS. 2b and 3b, the rollers 6', 6' are brought to a halt and moved out of frictional engagement with the clutch plate 7 so that the rotatory moment of the tubular member 5 is no longer transmitted to the clutch plate 7.

In this way, the film 9 is wound on the spool 8 up to the predetermined length and then the automatic clutch mechanism A comes into operation so that the tubular member 5 will rotate in idle motion.

Figure 1:
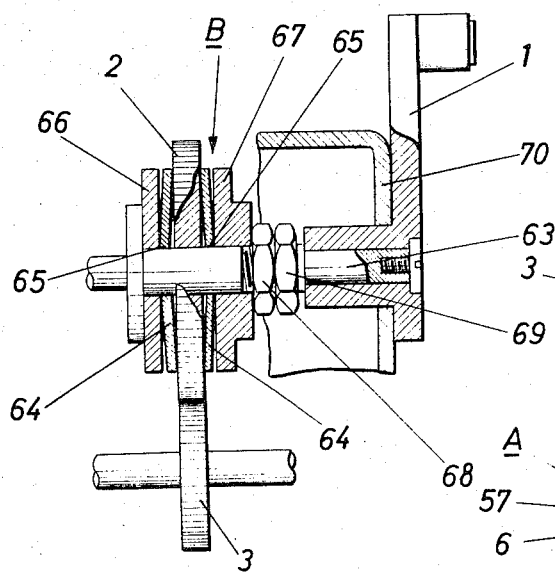
FIG. 1 is a cross-sectional view of a part of the improved film-transporting mechanism.

Referring now to FIG. 1, again, the film winding lever 1 is secured to a rotary shaft 63 to which the driven member or gear 2 shown in FIG. 4 and meshing with the gear 2 is fitted loosely. In FIG. 1, there is shown generally at B a slip device or friction clutch comprising dished friction plates 64, 64 having central apertures 65, 65, a stationary disc 66 secured to the shaft 63, and a movable disc 67 loosely fitted on the shaft 63. Said dished friction plates 64, 64 abut with their outer peripheral parts thereof against the gear 2 so that the parts adjacent to the central apertures 65, 65 are out of direct contact with the gear 2. To the rotary shaft 63 is threadedly attached a first nut 68 which abuts against the side movable disc 67. By screwing the nut 68 towards the movable disc 67, the latter may be brought nearer to the stationary disc 66 and the frictional force exerted on the gear 2 by the friction plates 64 may be enhanced. Numeral 69 denotes a locknut for the nut 68, and numeral 70 denotes a cover fitted to the rotary shaft 63.

In the above-mentioned construction, when the film-winding lever 1 is turned manually for rotation of the shaft 63, torque may be transmitted to the gear 2 through the discs 66, 67 and the friction plates 64, so that the gear 3 may be rotated in unison with the gear 2, for film-transporting and shutter-cocking operations in the manner already described in the foregoing. When the above-mentioned operations are brought to an end, further rotation of the winding lever 1 will result in the frictional sliding or slipping contact between the gear 2 and the friction plates 64, so that the gear 2 may not be forced into rotation. In this way, the overload of the film-winding lever 1 may be avoided and the various components of the film-transporting mechanism may be protected from injury. The nut 68 may be turned manually for fine adjustment of the frictional force between the friction plates 64 and the gear 2. The frictional force between the friction plates 64 and the gear 2 may be adjusted to the optimum amount following the film-transporting and the shutter-cocking operations such that the gear 2 is prevented from rotation and the friction plates may be rotated with idle motion in sliding contact therewith. In this way, rotary moment of the winding shaft is transmitted through a pair of friction plates and the latter may be rotated with an idle motion against the crank gear, thereby preventing the transmission of the overload to the working parts of the film-transporting mechanism. Thus, the mechanism may operate in safety and the construction of the same may be simplified.

According to the present invention, as above described, the film-transporting operation may be made smooth and positive, while the various complex operations such as multiple exposure or changeover from the longer to the shorter films and vice versa may be carried out in an easy manner.

What is claimed is:

1. In a photographic apparatus, a combination comprising a first shaft arranged to rotate a takeup reel for roll film; a clutch mechanism including a clutch plate secured to said first shaft, a rotary tubular member having a second shaft coaxial with said first shaft, said tubular member spacedly surrounding said clutch plate, an arresting member rotatably mounted on said first shaft and having projections extending between said tubular member and said clutch plate, and motion transmitting elements confined between said tubular member and said clutch plate and arranged to move into frictional engagement with said tubular member when the latter rotates in response to transmission of torque to said second shaft whereby said motion transmitting elements rotate said arresting member by way of said projections and said elements also rotate said first shaft by way of said clutch plate; and blocking means for terminating the rotation of said arresting member in response to completed transport of the film through a predetermined distance by way of the takeup reel and said first shaft to thereby disengage said motion transmitting elements from said tubular member and from said clutch plate through the intermediary of said projections so that said tubular member is free to rotate independently of said first shaft.

2. A combination as defined in claim 1, wherein said arresting member is a toothed ratchet wheel and said blocking means comprises a lever having a pallet and being pivotable to move said pallet into and from engagement with the teeth of said ratchet wheel.

3. A combination as defined in claim 1, wherein said tubular member has a cylindrical internal surface which is in frictional engagement with said motion transmitting elements while said tubular member rotates in response to transmission of torque to said second shaft and while said blocking means is disengaged from said arresting member.

4. A combination as defined in claim 1, wherein said motion transmitting elements are of spherical shape.

5. A combination as defined in claim 1, wherein said motion transmitting elements are rollers mounted on said projections.

6. A combination as defined in claim 1, further comprising means for transmitting torque to said second shaft, including a rotary driven member operatively connected with said second shaft, a winding member rotatable by hand about the axis of said driven member, and friction clutch means interposed between said winding member and said driven member.

7. A combination as defined in claim 6, wherein said friction clutch means comprises a pair of disks flanking said driven member and arranged to share the rotary movements of said winding member, and platelike friction generating members interposed between said disks and said driven member.

8. A combination as defined in claim 1, further comprising sensing means rotatable in response to transport of the film on rotation of said first shaft through the intermediary of said clutch mechanism, a rotary film frame counter, and means for rotating said frame counter in response to rotation of said sensing means.

9. A combination as defined in claim 8, wherein said film frame counter comprises a third shaft and further comprising a plurality of film feed control cams mounted on said third shaft, pivotable levers arranged to track said cams, and manually operated means for moving said levers into and from engagement with the respective cams.

* * * * *